Aug. 5, 1958 K. S. DUNLAP 2,846,668

MAGNETIC CORE CIRCUITS

Filed Sept. 7, 1954

INVENTOR
K. S. DUNLAP
BY James D. Falk
ATTORNEY

United States Patent Office 2,846,668 Patented Aug. 5, 1958

2,846,668

MAGNETIC CORE CIRCUITS

Kermit S. Dunlap, Madison, N. J., assignor to Bell Telephone Laboratories, Incorporated, New York, N. Y., a corporation of New York Application September 7, 1954, Serial No. 454,546

7 Claims. (Cl. 340—174)

This invention relates to magnetic core circuits and more specifically to facilitating the recognition of output pulses from magnetic cores.

The use of magnetic cores as information storage devices is becoming more common in various systems, such as computers, telephone systems, etc. These magnetic cores have been employed as memory elements in memory matrices, in delay lines, for switching purposes, and as memory and amplifier elements for writing on magnetic drums, among other applications. As is known the cores have essentially rectangular hysteresis loops, and information is stored in the core by setting it to one remanent state of magnetization, known as the set state. If information is not to be stored in the core, it is left in the other remnant state of magnetization, known as the unset state.

As is known in the art, magnetic core circuits have generally included at least a set winding, an advance winding, and an output winding. When it is desired to store information in a magnetic core, a pulse is applied to set winding which generates a magnetomotive force causing the magnetic core to be switched to its set state. When it is desired to read out this information, an advance pulse generates a magnetomotive force causing the magnetic core to be switched back to its unset state. The change in flux in the magnetic core during the switching of the magnetic state of the core from its set to unset state causes an output pulse to be generated in the output winding.

Theoretically, when a pulse is applied to the advance winding of an unset core, no output pulse should be generated in the output winding as there should be no change of flux in the magnetic core. Actually a pulse does occur because the coefficient of coupling $k$ between the advance and output windings when the core is in its unset state is not zero. Coupling exists between these two windings by virtue of two paths: first, and of lesser importance, there is an air path for leakage flux from the advance winding that is coupled to the output winding; second, there is a path through the magnetic core since there is a flux change in the magnetic material itself due to the fact that the hysteresis loop is not exactly rectangular but only approximates a rectangle or, as it is often referred to in the art, the desired square hysteresis loop.

The magnitude of the error or disturbing pulse, as it is known in the art, appearing on the output winding of an unset core when an advance pulse is applied to the advance winding of that core is thus dependent upon the portion of the hysteresis loop traversed by the core material upon application of the advance pulse. The larger the slope, i. e., the further away from the desired rectangular characteristic, the more flux is generated in the core and the larger the change of flux in the core material; hence, the larger the error output pulse. Conversely, as the slop is decreased toward the theoretical, the change of flux through the core is decreased but the air leakage flux is increased and, as noted above, some amount of this air leakage flux will also couple the output winding with the advance winding.

This disturbing output pulse from a magnetic core in an unset state is undesirable as it may render it difficult to distinguish between true and disturbing pulses and may require the utilization of extra circuit components to remove it or prevent this disturbing pulse from acting upon subsequent circuitry as a true output pulse. The ratio between the magnitude of the error output pulse or disturbing pulse generated by a core in an unset state and the magnitude of the true output pulse generated by a magnetic core in a set state can be defined as the signal-to-noise ratio of the magnetic core. If the signal-to-noise ratio is too small the subsequent circuitry either cannot distinguish between the true and the disturbing pulses or additional circuit elements are required to enable this subsequent circuitry to distinguish between these pulses.

It is a general object of this invention to improve magnetic core circuits.

It is an object of this invention to provide magnetic cores which produce no effective output pulse upon the application of the advance pulse to the core when the core is in an unset state.

It is a further object of this invention to improve and increase the signal-to-noise ratio of the magnetic cores.

In one specific illustrative embodiment of this invention, a magnetic core having a substantially square hysteresis loop is provided with a plurality of windings. These windings include the well known windings, i. e., the set, advance and output windings and, in addition, in accordance with an aspect of this invention, a neutralizing winding. The functions of the well known windings of the magnetic core are substantially as the art teaches. The neutralizing winding is an additional winding which, in accordance with this invention, serves effectively to neutralize any output pulse generated in the output winding upon application of an advance pulse when the magnetic core is in its unset state. In one embodiment of this invention this neutralizing winding is advantageously tightly coupled to the set and advance windings and is connected in series with the output winding which is located on the core directly opposite the set, advance and neutralizing windings.

It is a feature of this invention that a magnetic core has a neutralizing winding in which a pulse is generated upon the application of the advance pulse.

It is another feature of this invention that this neutralizing winding is connected in series with the output winding and the pulse generated in the neutralizing winding effectively neutralizes the output pulse generated in the output winding of the magnetic core upon application of an advance pulse to the magnetic core when the magnetic core is in an unset state.

It is a further feature of this invention that the output winding is positioned on the core diamertically opposite the advance winding to minimize the air path leakage flux coupling between them and thus to reduce the output pulse generated in the output winding when an advance pulse is applied to the advance winding of an unset core.

A complete understanding of this invention and the features thereof may be gained from the following description and accompanying drawing, in which.

Figure 1:
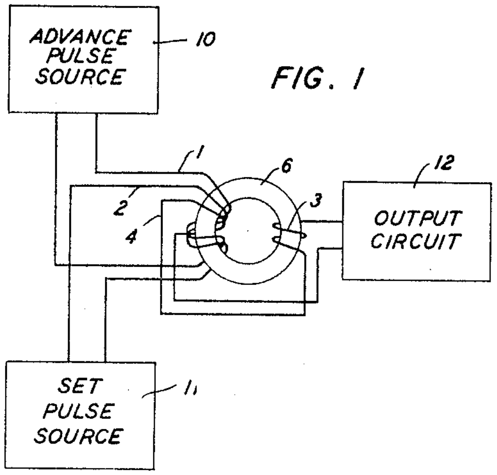
Fig. 1 is a schematic representation of a magnetic core circuit illustrative of one specific embodiment of this invention.

In Fig. 1, a magnetic core 6 is depicted with a plurality of windings. Winding 1 is the advance winding which as described in general above applies the advance pulse to the magnetic core. The advance pulse is generated in advance pulse source 10. The set pulse winding 2 is depicted tightly coupled to the advance winding 1 and connected to the set pulse source 11 which generates the pulse to switch the magnetic core to its set state. Winding 3 is the output winding of magnetic core 6 and is connected to an output circuit 12 which utilizes the output pulses generated in the output winding 3. The advance, set and output windings 1, 2 and 3 are well known in the art and function in their usual manner. Magnetic core 6 has an additional winding 4 which will be referred to herein as the neutralizing winding. The neutralizing winding 4 is depicted in Fig. 1 tightly coupled to the advance and set windings 1 and 2 on magnetic core 6 and connected in series with output winding 3. The neutralizing winding 4 is also depicted as diametrically opposite output winding 3 on magnetic core 6. Neutralizing winding 4 is shown tightly coupled to windings 1 and 2, and such coupling is advantageous but is not necessary to the successful operation of this invention.

Figure 2A:
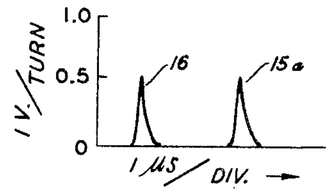
Fig. 2 is a graphic representation of the output pulses of a magnetic core for various amounts of coupling between the advance and output windings.

As described above, the air flux leakage is dependent primarily upon the positioning of the output winding with respect to the advance winding on the magnetic core. If the output winding were tightly coupled with the advance winding the disturbing pulse generated in the output winding upon the application of the advance pulse to an unset core is shown in Fig. 2A. Here, it is noted that the output pulse 15*a* is substantially the same size as the advance pulse 16 developed across the advance winding 1. The output pulse is substantially equal to the advance pulse inasmuch as maximum coupling of the two windings is obtained with the windings so positioned.

Figure 2B:
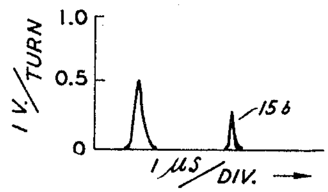

Now, if the output winding is placed on the core in a position at right angles to the position of the advance winding, the disturbing pulse 15*b* generated in the output winding upon application of the advance pulse to an unset core is as shown in Fig. 2B. It is seen that the output pulse 15*b* generated with the windings in this position upon application of the same advance pulse shown in Fig. 2B is substantially smaller than the disturbing pulse 15*a* with the windings tightly coupled. This reduction in the size of disturbing pulse is mainly due to the increased loss of air leakage flux as the output winding is moved away from the advance winding around the periphery of the core.

Figure 2C:
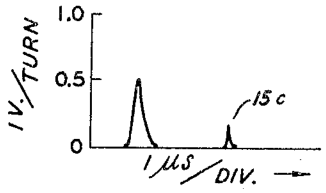
Figure 2D:
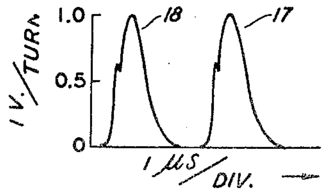

Now, if the output winding is moved to a position on the core directly opposite the advance winding, the disturbing pulse 15*c* generated in the output winding of an unset core is as shown in Fig. 2C. At this point the loss of air leakage flux is a maximum and the residual disturbing pulse is due primarily to the coupling of the windings by flux leakage through the core itself. This is the smallest disturbing pulse that can be obtained by positioning of the windings on the core. However, the desired output pulse 17 of magnetic core 6 will be as shown in Fig. 2D for all positions of the output winding on the core when the core is in the set state. This results from the fact that the high permeability of the core in the set state provides maximum coupling regardless of position and the loss of air leakage flux has negligible effect. Further the advance pulse 18 developed across the advance winding when the core has priorly been set is considerably larger than the voltage 16. The output pulse 17 will be substantially equal to the advance pulse 18.

Figure 3:
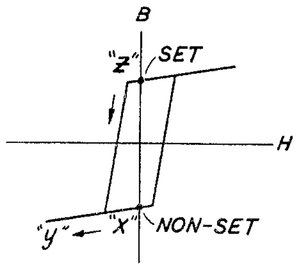
Fig. 3 is a representation of an idealized hysteresis loop.

The voltages or pulses generated in the output windings of magnetic core 6 when the core is in different magnetic states is best explained by reference to Fig. 3 which shows an idealized hysteresis loop. In an unset state upon the application of an advance pulse the voltage generated in the output winding is due to the change in the state of the magnetization of the core in traversing the hysteresis loop from point $x$ to point $y$ on Fig. 3. However, if the core were in a set state of magnetization upon the application of the advance pulse, the state of magnetization of the core would change from point $z$ to point $y$. The voltage generated in the output winding in the set state would then be due to the flux created in traversing the hysteresis loop from point $z$ to point $y$. Thus the flux created by the core magnetization traversing these different portions or sections of the hysteresis loop determines the size of the voltage generated per turn in the output winding. The voltage generated in the output winding of the magnetic core 6 when the magnetic core is in a set state of magnetization is substantially independent of the coupling resulting from air leakage flux, and the voltage depends primarily upon the core permeability which is at a maximum over the portion of the hysteresis loop traversed in the set state. These differences in the nature of and the amount of coupling between the windings when the magnetic core is in its different states of magnetization may be utilized to remove disturbing pulses.

It has been described above that by placing the output winding directly opposite the advance winding on the magnetic core, the disturbing pulse is reduced to its minimum value. However, this disturbing pulse may still be of sufficient magnitude to create a signal-to-noise ratio which is too small for the purpose of operation of the subsequent circuitry.

To completely remove or obviate this disturbing pulse, in accordance with another aspect of this invention, the neutralizing winding 4 is provided in addition to the usual core windings provided. This enutralizing winding 4 if wound as depcited in Fig. 1 will result in the suppression of disturbing pulses in the output winding of the magnetic core 6. This result, namely the suppression of the disturbing pulses, is accomplished by connecting the neutralizing winding 4 in series opposition to the output winding and having the neutralizing winding comprise a lesser number of turns than the output windings.

With the magnetic core in an unset state and the output winding located opposite the advance winding, there will be generated in the output winding a smaller voltage or pulse per turn than in the neutralizing winding on application of the advance pulse due to the increased loss of air leakage flux by the output winding and the tight coupling of the neutralizing winding with the advance winding making coupling losses a minimum. It is thus possible by increasing the number of turns on the neutralizing winding to produce actual negative disturbing pulses at the output terminals. A negative disturbing pulse occurs when the pulse generated in the neutralizing winding is greater than the disturbing pulse generated in the output winding. This may advantageously be done as the output circuit is generally designed to ignore negative pulses appearing at the output winding.

The ration of the number of turns required on the neutralizing winding to the number of turns on the output winding, if these windings are wound diametrically opposite each other on the core so as to exactly neutralize the output pulse, is equal to the coefficient of coupling $k$. However, it is possible to wind the neutralizing winding at various positions upon the magnetic core and still obtain the same result, namely the removal of positive disturbing pulses. However, if this neutralizing winding is not tightly coupled with the advance winding, the number of turns on the neutralizing winding has to be increased if this winding is to continue adequately to compensate for any coupling loss due to air leakage.

The set winding is depicted tightly coupled to both the advance and neutralizing windings. However, this location nor any specific location of the set winding is not necessary to the successful operation of this invention inasmuch as the set winding always produces a negative pulse on the output winding of a magnetic core. These negative pulses produced by the set pulse have no effect on subsequent circuitry and consequently may be ignored.

Figure 4:
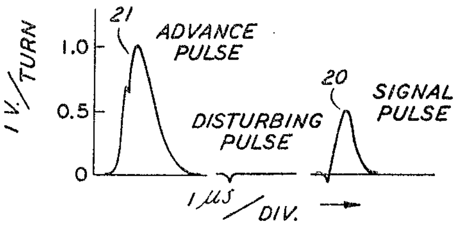
Fig. 4 illustrates the output pulses from a magnetic core circuit in accordance with the embodiment shown in Fig. 1.

The outputs from the magnetic core 6 with the windings as shown in Fig. 1 are graphically illustrated in Fig. 4. The output signal pulse 20, when the core is wound in accordance with this invention, is not as large as the advance pulse 21 in the set state inasmuch as the neutralizing winding 4 has generated therein a pulse which is connected in series opposition to the pulse generated in the output winding 3. This output signal pulse remains of sufficient magnitude to correctly operate subsequent circuitry. However, in the unset state, the disturbing pulse has been reduced to a slightly negative value. This means that there is no actual disturbing pulse as negative pulses are ignored by subsequent circuitry. The signal-to-noise ratio is a maximum as the noise lead has been reduced to zero.

It is noted that in the output pulses 17 and 20 shown as signal pulses, namely in Fig. 2D and Fig. 4, there is an apparent discontinuity in the wave form. This discontinuity results from first traversing a portion of the flat part of the hysteresis loop curve when the core is in the set state, and then traversing the steep part of the hysteresis loop so that more flux is created and the output pulse is considerably increased in magnitude.

It is possible, as shown above, to obtain perfect neutralization of the disturbing pulse or to overcompensate and obtain a negative disturbing pulse by variation in the number of turns of the neutralizing winding. It also has been shown that it is possible to vary the position of the neutralizing winding as long as such variation is accompanied with a corresponding variation in the number of turns in the neutralizing winding to still obtain adequate compensation and indeed to overcompensate.

It is to be understood that the above described arrangements are illustrative of the application of the principles of the invention. Numerous other arrangements may be devised by those skilled in the art without departing from the spirit and scope of the invention.

What is claimed is:

1. A magnetic core circuit including a magnetic core, having a plurality of windings thereon, said windings including at least a set, an advance and an output winding, and means for substantially preventing the appearance of an output pulse on said output winding when an advance pulse is applied to said advance winding and said core is in its unset state, said means including a neutralizing winding closely coupled to said advance winding and connected in series with and in a sense such as to oppose said output winding, said output winding being positioned on said core diametrically opposite said advance winding, and said neutralizing winding having substantially $k$ times the number of turns of said output winding, $k$ being the coefficient of coupling between said neutralizing winding and said output winding.

2. A magnetic core circuit in accordance with claim 1 wherein the turns of said neutralizing winding are interwound on said core with the turns of said advance winding.

3. A magnetic core circuit including a magnetic core having a plurality of windings thereon, said windings including at least a set, an advance and an output winding, and means for substantially suppressing output pulses on said output winding when an advance pulse is applied to said advance winding and said core is in its unset state, said means including a neutralizing winding interwound on said core with the turns of said advance winding and connected in series with and in a sense such as to oppose said output winding, said neutralizing winding having substantially $k$ times the number of turns of said output winding, $k$ being the coefficient of coupling between the said output and said advance windings.

4. A magnetic core circuit including a magnetic core having a plurality of windings thereon, said windings including at least a set, an advance and an output winding, and means for substantially preventing the appearance of an output pulse upon said output winding when an advance pulse is applied to said advance winding and said core is in its unset state, said means including a neutralizing winding on said core connected in series with and in a sense such as to oppose, said output winding, and said output winding being positioned on said core diametrically opposite said advance winding.

5. A magnetic core circuit including a magnetic core having a plurality of windings thereon, said windings including at least an advance and an output winding, and means for producing a negative output pulse when an advance pulse is applied to said advance winding and said core is in its unset state, said means including said output winding, a neutralizing winding connected in series with and in a sense such as to oppose, said output winding, said neutralizing winding having more than $k$ times the number of turns of said output winding but having fewer turns than said output winding, $k$ being the coefficient of coupling between said output and said advance windings.

6. A magnetic core circuit including a magnetic core having a plurality of windings thereon, said windings including at least a set, an advance and an output winding, and means for producing a negative output pulse when an advance pulse is applied to said advance winding and said core is in its unset state, said means including said output winding, a neutralizing winding closely coupled to said advance winding and connected in series with, and in a sense such as to oppose, said output winding, said neutralizing winding having more than $k$ times the number of turns of said output winding but having fewer turns than said output winding, $k$ being the coefficient of coupling between said output and advance windings, said output winding being positioned on said core diametrically opposite said advance winding, and the turns of said neutralizing winding being interwound with the turns of said advance winding.

7. In an information storage device, a magnetic core having a set winding, an advance winding, and an output winding thereon, and means for reducing the error output pulse appearing on said output winding upon application of a pulse to said advance winding when said core is in an unset state, said means comprising a neutralizing winding on said core serially connected with said output winding and in opposition therewith, and said output winding being positioned diametrically opposite said advance winding upon said core to minimize the flux coupling between said advance and output windings.

References Cited in the file of this patent

UNITED STATES PATENTS

| | | |
|---|---|---|
| 2,651,769 | Stafford | Sept. 8, 1953 |
| 2,654,080 | Browne | Sept. 29, 1953 |
| 2,680,819 | Booth | June 8, 1954 |

FOREIGN PATENTS

| | | |
|---|---|---|
| 457,282 | Germany | Mar. 13, 1928 |

OTHER REFERENCES

Publication Paper No. 150 of IRE Meeting March 5, 1952; pp. 6, 7, and an additional sheet containing Fig. 8.